United States Patent
Rees et al.

(10) Patent No.: US 7,495,600 B2
(45) Date of Patent: Feb. 24, 2009

(54) AIRFIELD SURFACE TARGET DETECTION AND TRACKING USING DISTRIBUTED MULTILATERATION SENSORS AND W-BAND RADAR SENSORS

(75) Inventors: Bernard Rees, Sherman Oaks, CA (US); Michael Coluzzi, Los Angeles, CA (US); Duveen Rivera, Thousand Oaks, CA (US); Ronald Colgin, Stevenson Ranch, CA (US)

(73) Assignee: ITT Manufacturing Enterprise, Inc., Wilmington, DE (US)

(*) Notice: Subject to any disclaimer, the term of this patent is extended or adjusted under 35 U.S.C. 154(b) by 0 days.

(21) Appl. No.: 10/745,646

(22) Filed: Dec. 29, 2003

(65) Prior Publication Data

US 2005/0140540 A1 Jun. 30, 2005

(51) Int. Cl.
*G01S 13/93* (2006.01)
(52) U.S. Cl. ............................... 342/29; 342/36; 342/37
(58) Field of Classification Search .................. 342/29
See application file for complete search history.

(56) References Cited

U.S. PATENT DOCUMENTS

| | | | | |
|---|---|---|---|---|
| 3,713,730 A * | 1/1973 | Kaplan | ............... | 382/255 |
| 4,179,695 A * | 12/1979 | Levine et al. | ............... | 342/37 |
| 4,197,536 A * | 4/1980 | Levine | ............... | 342/37 |
| 5,179,384 A * | 1/1993 | De Haan | ............... | 342/37 |
| 5,262,784 A * | 11/1993 | Drobnicki et al. | ............... | 342/45 |
| 5,448,243 A * | 9/1995 | Bethke et al. | ............... | 342/59 |
| 5,530,440 A * | 6/1996 | Danzer et al. | ............... | 340/933 |
| 5,557,278 A * | 9/1996 | Piccirillo et al. | ............... | 342/29 |
| 5,596,326 A * | 1/1997 | Fitts | ............... | 342/30 |
| 5,629,691 A * | 5/1997 | Jain | ............... | 340/961 |
| 6,094,169 A * | 7/2000 | Smith et al. | ............... | 342/465 |
| 6,211,811 B1 * | 4/2001 | Evers | ............... | 342/36 |
| 6,337,652 B1 * | 1/2002 | Shiomi et al. | ............... | 342/37 |
| 6,462,697 B1 * | 10/2002 | Klamer et al. | ............... | 342/36 |
| 6,483,453 B2 * | 11/2002 | Oey et al. | ............... | 342/29 |
| 6,486,825 B1 * | 11/2002 | Smithey | ............... | 342/29 |
| 6,633,259 B1 * | 10/2003 | Smith et al. | ............... | 342/456 |
| 6,909,381 B2 * | 6/2005 | Kahn | ............... | 340/945 |
| 2002/0109625 A1 * | 8/2002 | Gouvary | ............... | 342/29 |
| 2002/0116127 A1 * | 8/2002 | Sadler | ............... | 701/301 |
| 2002/0130814 A1 * | 9/2002 | Smith et al. | ............... | 342/465 |
| 2002/0163461 A1 * | 11/2002 | Smithey | ............... | 342/29 |
| 2003/0009278 A1 * | 1/2003 | Mallet et al. | ............... | 701/120 |

OTHER PUBLICATIONS

"Applications of Milimeter-Wave Radars to Airport Surface Surveillance." Jain, Atul; Digital Avionics Systems Conference, 1994. 13th DASC., AIAA/IEEE Oct. 30-Nov. 3, 1994 pp. 528-533.*

(Continued)

*Primary Examiner*—Thomas H Tarcza
*Assistant Examiner*—Matthew M Barker
(74) *Attorney, Agent, or Firm*—Baker & Hostetler LLP

(57) ABSTRACT

An airport surface target detection, classification and tracking system using a network of multilateration (SSR) sensors and W-band radar sensors is used to provide automatic location and tracking information about ground moving aircraft or targets. The information from the distributed sensors are coordinated to provide accurate location and tracking information for coordination of surface traffic and navigation within an airport.

74 Claims, 6 Drawing Sheets

OTHER PUBLICATIONS

"Airport surface surveillance with a network of miniradars" Galati, G.; Naldi, M.; Ferri, M.; Jan. 1999 pp. 331-338.*

"A novel W-band radar for airport traffic monitoring: implementation, first operational results, perspectives" Mauro, F.; Galati, G.; Naldi, M.; Physics and Engineering of Millimeter and Sub-Millimeter Waves. Jun. 2001 pp. 27-32 vol. 1.*

Xun et al. Automatic HHR Target Recognition Based on Prony Model Wavelet and Probability Neural Network. CIE International Conference of Radar. Oct. 8-10, 1996. pp. 143-146.*

"Intelligent Airport", Transtech Airport Solutions Inc., 6 pages, www.transtech-solutions.com.

* cited by examiner

AIRFIELD SURFACE TARGET DETECTION AND TRACKING USING DISTRIBUTED MULTILATERATION SENSORS AND W-BAND RADAR SENSORS

FIELD OF THE INVENTION

The present invention relates generally to airport surface traffic control. More particularly, the present invention relates to airport surface target detection, classification and tracking using a network of distributed multilateration sensors and distributed W-band radar sensors.

BACKGROUND OF THE INVENTION

An issue of growing importance at airfields and airports is the control and management of surface movement of aircraft, vehicles and foot traffic. As more airplanes are filling the skies, there has been a burgeoning burden on ground crews and the control tower in managing the increasingly congested traffic on runways, taxiways, loading and standby areas. Of particular concern is the rising incidences of potential runway incursions occurring between airplanes and, additionally, with ground vehicles. A runway incursion occurs whenever there is an event that creates a possible collision between an aircraft and another aircraft, vehicle, or object on the runway and is mandatorily reported to the FAA.

Airlines have taken the initiative to reduce air-traffic congestion or runway collisions by using enhanced communications gear and revised landing approaches. However approaches to runways, taxiways, arrival/departure gates and other locations of interests are primarily navigated by signals from ground crew, visual feedback and control tower instructions. In varying inclement weather, night conditions, or congested airports, there is an increased concern that visually guided navigation of the runways, taxiways, arrival/departure gates can be compromised. Moreover, it is not unheard of for pilots to become disorientated at an unfamiliar airport and guide their airplane to the wrong terminal or even off a taxiway.

There have been several efforts underway to alleviate airport surface movement problems. On such effort is the ASDE-X program (Airport Surface Detection Equipment) by Raytheon which uses distributed multilateration sensors coupled with a centralized X-band radar. The Raytheon system is a positional system and the centrally located X-band radar is used to track surface objects that do not have a multilateration responsive transponder.

Similarly, Transtech of Windsor, Conn. has devised a surface movement radar system using distributed millimeter wave sensors with a centralized X-band radar and optical identification sensors, to generate a real time situational map of the airfield. However, as alluded above, the Raytheon and Transtech systems require a large and expensive centralized X-band radar and are not capable of providing accurate orientation of a detected aircraft or wheel positioning.

Therefore, there has been a long standing need in the airport community for systems and methods which provide a more accurate airplane or target detection, classification and tracking.

SUMMARY OF THE INVENTION

The foregoing needs are met, to a great extent, by the present invention, wherein in one aspect an apparatus is provided that in some embodiments a coordinated combination of multilateration sensors and compact, distributed radars is used to facilitate accurate detection, classification and tracking of airplanes and large objects moving within an airport.

In accordance with one embodiment of the present invention, and airport surface target surveillance and tracking system is provided, comprising, a plurality of miniaturized W-band radar scanning sensors distributed within an airport, the W-band sensors illuminating targets within the airport, a multilateration sensor positioned within the airport, the multilateration sensor obtaining a target aircraft tail number for an aircraft target, a data fusion center; and a communication link between the W-band sensors and the data fusion center, and between the multilateration sensor and the central fusion center, wherein target data from the plurality of W-band sensors and the multilateration sensor is communicated to the data fusion center and is evaluated to identify and track the target.

In accordance with another embodiment of the present invention, an airport surface target surveillance and tracking system is provided, comprising a plurality of miniaturized W-band energy emitting means for detecting targets within an airport, the W-band emitting means being distributed within the airport, an aircraft tail number interrogating means for interrogating target aircraft within its vicinity, a data fusion means for evaluating data from the plurality of W-band energy emitting means and data from the aircraft tail number interrogating means, and a communications networking means for communicating data from the plurality of W-band energy emitting means and the aircraft tail number means to the data fusion means, wherein the communicated data is correlated to determine target type, target location, target speed and target orientation., In accordance with yet another embodiment of the present invention, a method for airport surface target surveillance and tracking is provided, comprising the steps of detecting a surface target utilizing a plurality of miniaturized W-band radar scanning sensors distributing within an airport, acquiring a tail ID of the surface target that is an aircraft in the airport, determining information of the detected surface target from at least one of the W-band sensors, conveying the information and available tail ID to a data processing center, evaluating the conveyed information and available tail ID, quantifying the target based on the conveyed information and available tail ID, and tracking the target.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
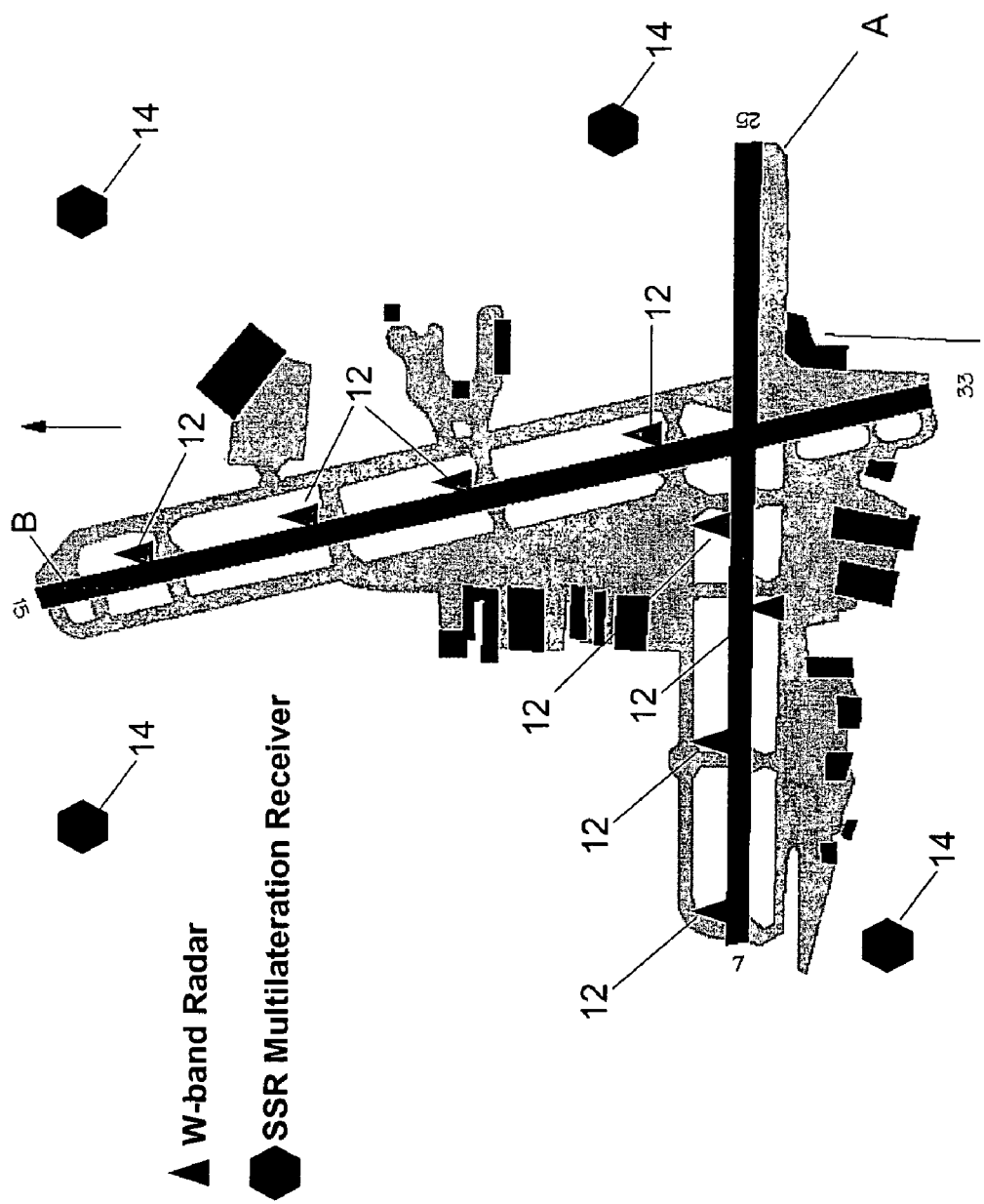
FIG. 1 is an illustration of an airport installation according to this invention.

The invention will now be described with reference to the drawing figures, in which like reference numerals refer to the like parts throughout.

The present invention affords the airport controller much higher fidelity information about aircraft movement and predictive capabilities to alert to a potential runway incursion. Additionally, based on the implementation utilized, pilot(s) involved in a possible incursion may be signaled from within the cockpit or from nearby signaling devices (for example, flashing lights.) Thereby, the present invention reduces runway incursions and improves airport surface awareness and safety.

In the exemplary embodiments of this invention, two sensor types: a system of ground based multilateration sensors operating preferably at L-band with SSR protocols and a system of W-band miniaturized 2D Doppler radars, are distributed in as many locations as required to cover the airport surface of interest. The data from this distributed sensor suite is combined centrally with fusion software before being presented to appropriate personnel, for example, ground controllers.

FIG. 1 is a bird's eye view of a typical airport 10 with an exemplary arrangement of the systems of this invention. The airport 10 is shown with two runways A and B. Each of the runways A and B are punctuated with the exemplary W-band radar sensors 12 at semi-regular intervals. Since W-band radar sensors 12 are known to have a range of approximately 150-250 meters, and to provide adequate coverage the sensors 12 are positioned at intervals of less than 250 meters. Multilateration sensors 14 using Secondary Surveillance Radar (SSR) protocols are positioned at various outer sectors of the airport to cover the traffic areas of the airport. The detection of surface targets registered by both the W-band radar sensors 12 and the multilateration sensors 14 are "fused" to generate an accurate and predictive map of the targets on or about the airfield.

Exploitation of the capabilities of the data received from the W-band radar sensors 12 and multilateration sensors 14, as further discussed below, enables the determination of target speed, orientation, probability of incursion, aircraft type, wheel position on tarmac, etc. The exemplary multilateration sensor 14 sets can also be placed on the ground adjacent to runways, taxiways, overlooking arrival/departure gates and other locations of interest. The sensor sets are unattended systems and communicate with each other and a Central Fusion Center (CFC) using, for example, a wireless LAN at W-band or other designated band or communication scheme.

The multilateration sensor 14 is a miniaturized Secondary Surveillance Radar (SSR) transmitter and receiver that interrogates aircraft in its vicinity to obtain aircraft ID (i.e., tail number.) Both sensors 12 and 14 can provide location information about ground moving aircraft or objects. The multilateration sensors 14 may use one or more of several object ranging and location techniques such as, for example, time difference of arrival (TDOA) to provide location information.

The W-band radar sensor 12 contains a rotating or sector scanning W-band radar and may be based on radar systems seen, for example, in the automobile industry. The W-band radar sensor 12 is of a miniature size, being about the size of an automobile license plate or less, depending on design preference. The small size of the W-band radar sensor 12 facilitates easy non-obstructive distribution about the airport. The W-band radar sensor 12 is relatively inexpensive to a central W-band radar system and also has minimal power requirements and, therefore, can be mounted to selected runway/taxiway lights or indicators, if desired.

It should be appreciated that in various exemplary embodiments of this invention, the W-band radar sensor 12 may only emit a few milliwatts of power, while allowing ranging of a local vehicle, aircraft of pedestrian of up to a distance of at least 250 m. The exemplary W-band radar sensor 12 is capable of locating and tracking these targets to within a resolution of about 1 m in range and cross range. These sensors 12 can also measure target Doppler up to +/−75 m/s with high accuracy.

Figure 2:
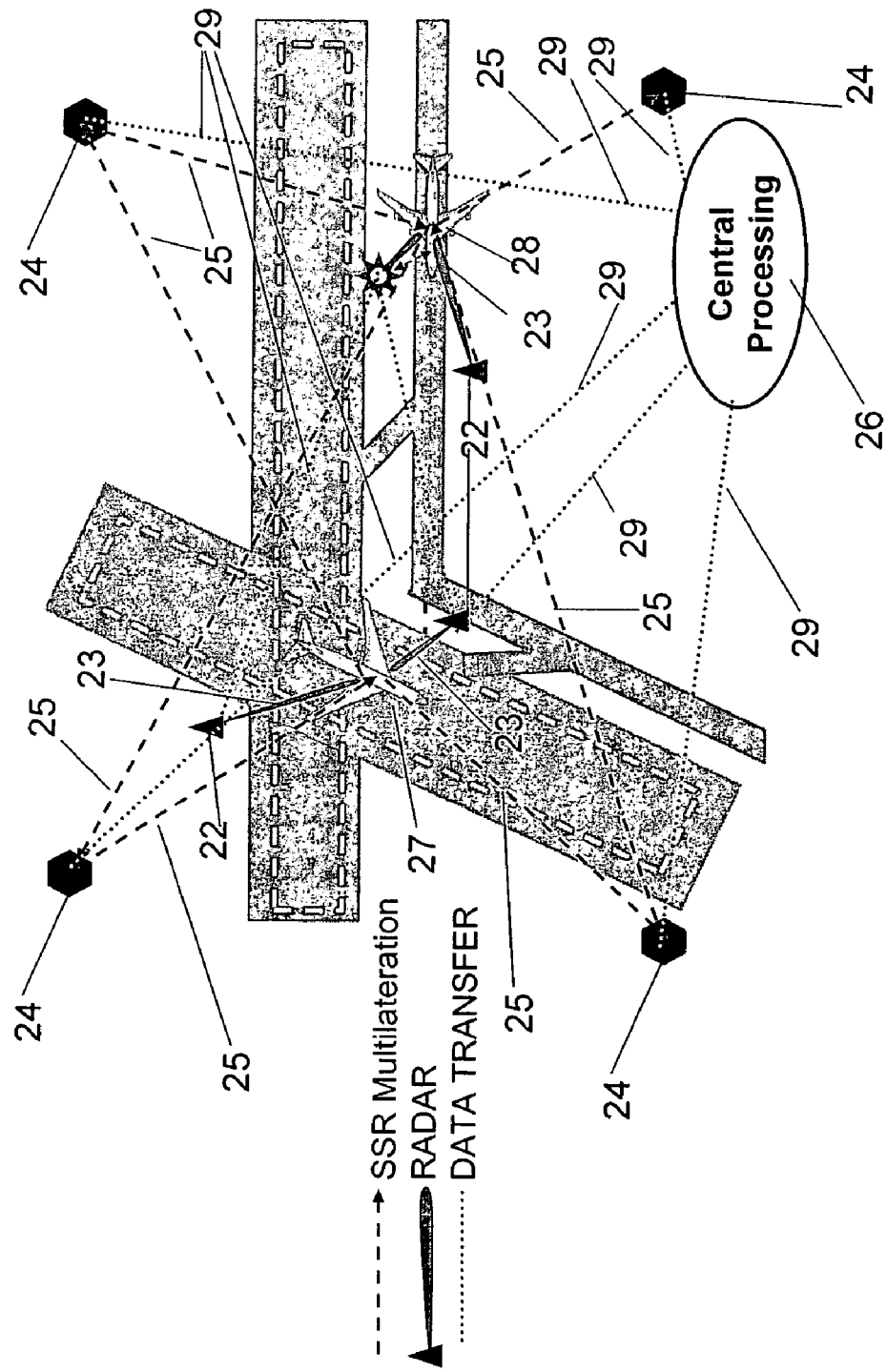
FIG. 2 is an illustration of sensor and data communication paths.

FIG. 2 is illustration of an exemplary airport installation 20 showing various communication paths. In the arrangement of FIG. 2, multilateration sensors 24 are situated at near perimeter locations about the airfield and are shown interrogating, via beam paths 25, the surface aircrafts 27 and 28. In concert with the multilateration sensors 24, four W-band radar sensors 22 are shown radiating their beams 23 upon the aircrafts 27 and 28. The location of the various sensors 22 and 24 enable complete coverage and precise tracking of aircraft and surface moving objects on the airfield.

A LAN is provided from the sensors 22 and 24 to a CFC 26 as indicated by the data/communication paths 29. The paths 29 maybe bidirectional according to design preferences. In the exemplary embodiment of FIG. 2, the LAN is a wireless LAN and enables communication between the sensors 22 and 24 with the CFC 26, as well as between sensors 22 and 24 via the CFC 26. Data forwarded to the CFC enables traffic-driven resource management among the sensors 22 and 24, allowing tasking of target updates and track confirmations between sensors 22 and 24 via the wireless LAN.

Figure 3:
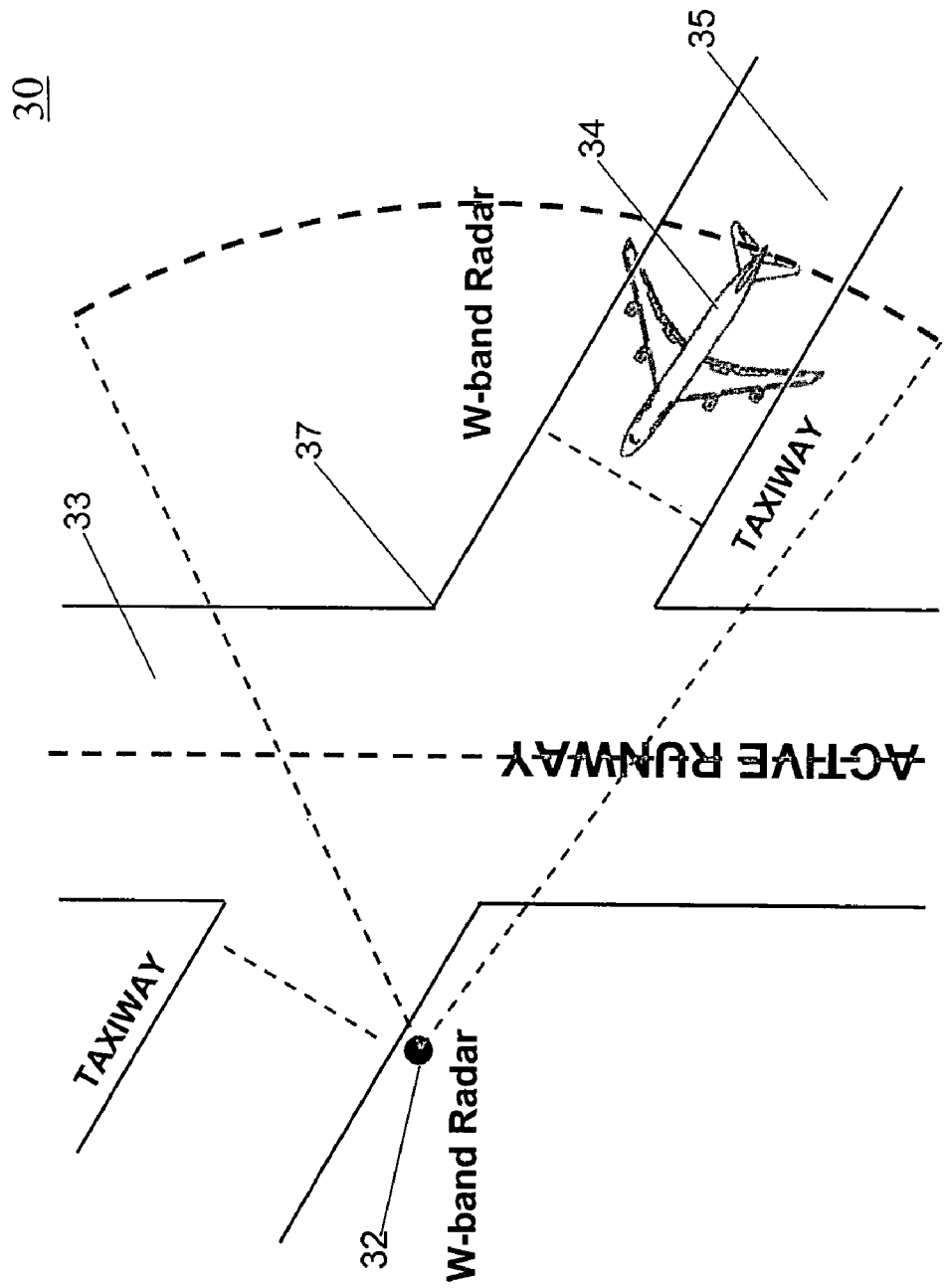
FIG. 3 is an illustration of the distributed positioning of W-band radars.

FIG. 3 is a close up illustration of an exemplary arrangement 30 of a W-band radar sensor 32 at a critical airfield location. The exemplary arrangement 30 establishes the W-band sensor 32 at a juncture of an active runway 33 and a taxiway 35. An aircraft 34 is shown approaching the runway 33 from the taxiway 35. The W-band radar sensor 32 is illustrated with a current scan angle that encompasses the intersection 37 of the runway 33 and the taxiway 35. Other critical locations for W-band sensor 32 may be, for example, at airport gate areas to determine gate inventories and pushback of aircraft out of view of airport controllers and current ASDE-3 radars. The W-band sensor 32 is capable of detecting and tracking moving and stationary surface traffic (for example, aircraft, vehicles, etc.) and pedestrians and can accurately measure range, Doppler and azimuthal data.

The W-band radar sensor 32 can be configured to rotate through 360 degrees (at rates in excess of 60 rpm, for example) or do mechanical sector scan over a predetermined, LAN-tasked or CFC-tasked sector. The sensor 32 can be rotated to various sectors as required by traffic movement and, therefore, are not constrained by a limited sector scan.

Figure 4:
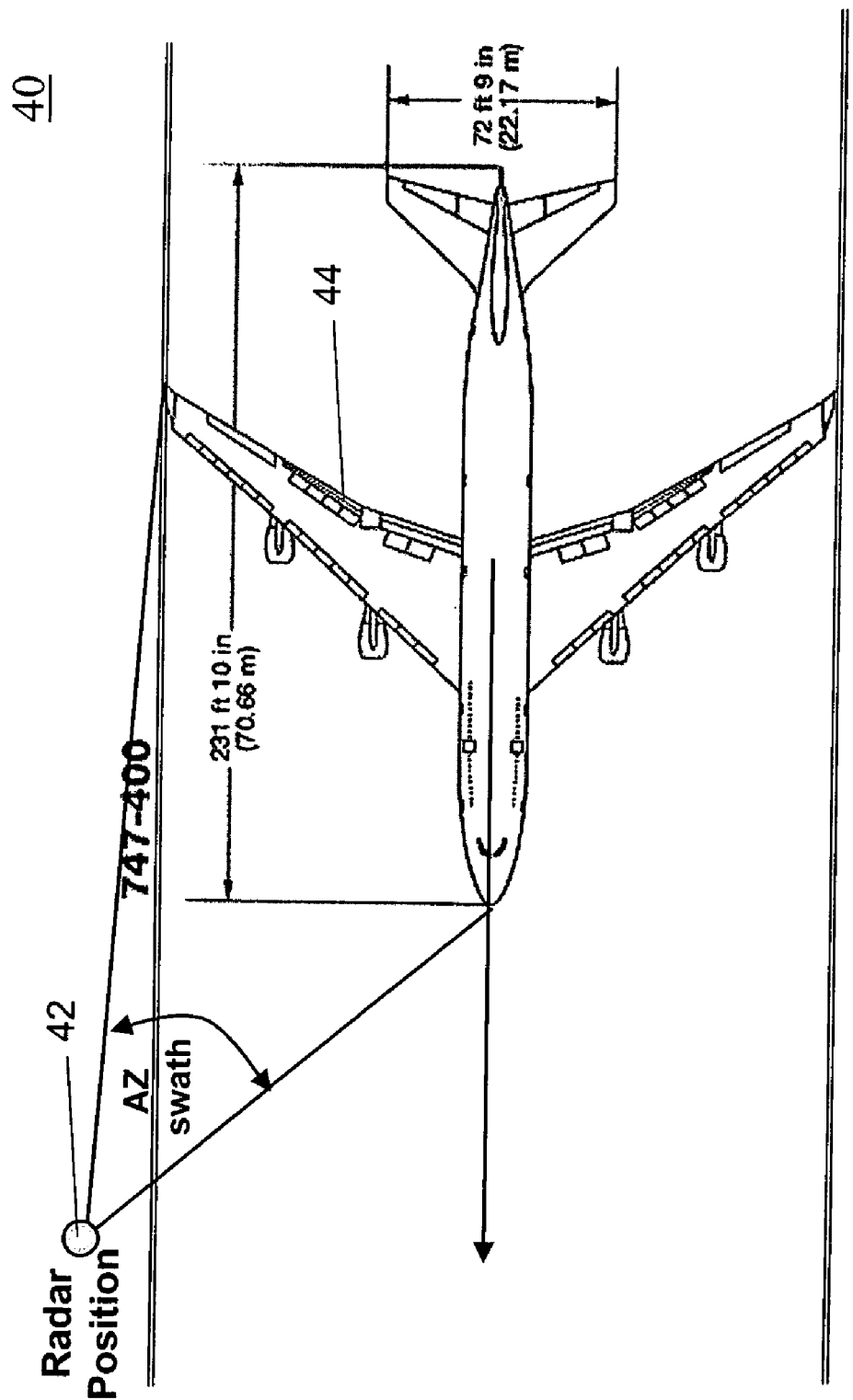
FIG. 4 is an illustration of aircraft detection.

FIG. 4 is a close up illustration 40 of a W-band radar sensor 42 scanning an aircraft 44. Since a W-band radar beam width is known to be very narrow, the aspect of the aircraft 44 can be obtained by scanning across its silhouette. As the aircraft 44 approaches or departs the sensor's 42 position, the aircraft's 44 speed and aspect will vary proportionately. While FIG. 4 illustrates an azimuthal scan, it should be appreciated that vertical aspects can be also derived depending on the orientation of the W-band radar sensor's 42 beam. By cross referencing, for example, dimensions and aspects for known aircrafts, the type of aircraft can be derived and, as in this illustration, is determined to be a Boeing 747-400. Similarly, various non-aircraft objects can be derived, for example, fire trucks, baggage trucks, etc.

The exemplary W-band radar sensors 42 may be programmed with plot extraction algorithms using Gilfillan proven edge detection techniques to provide increased detection and/or fidelity. Using aircraft tail numbers arrived at from the multilateration sensors (coupled into aircraft type and call sign) the accurate positioning on the airport surface is obtainable by determining positions of front/back of the aircraft, its wings and its wheels. These data can be used in the Central Fusion Center to accurately determine the current and predicted positioning of vital extremities of the aircraft with respect to the airport layout and signaling systems.

Figure 5:
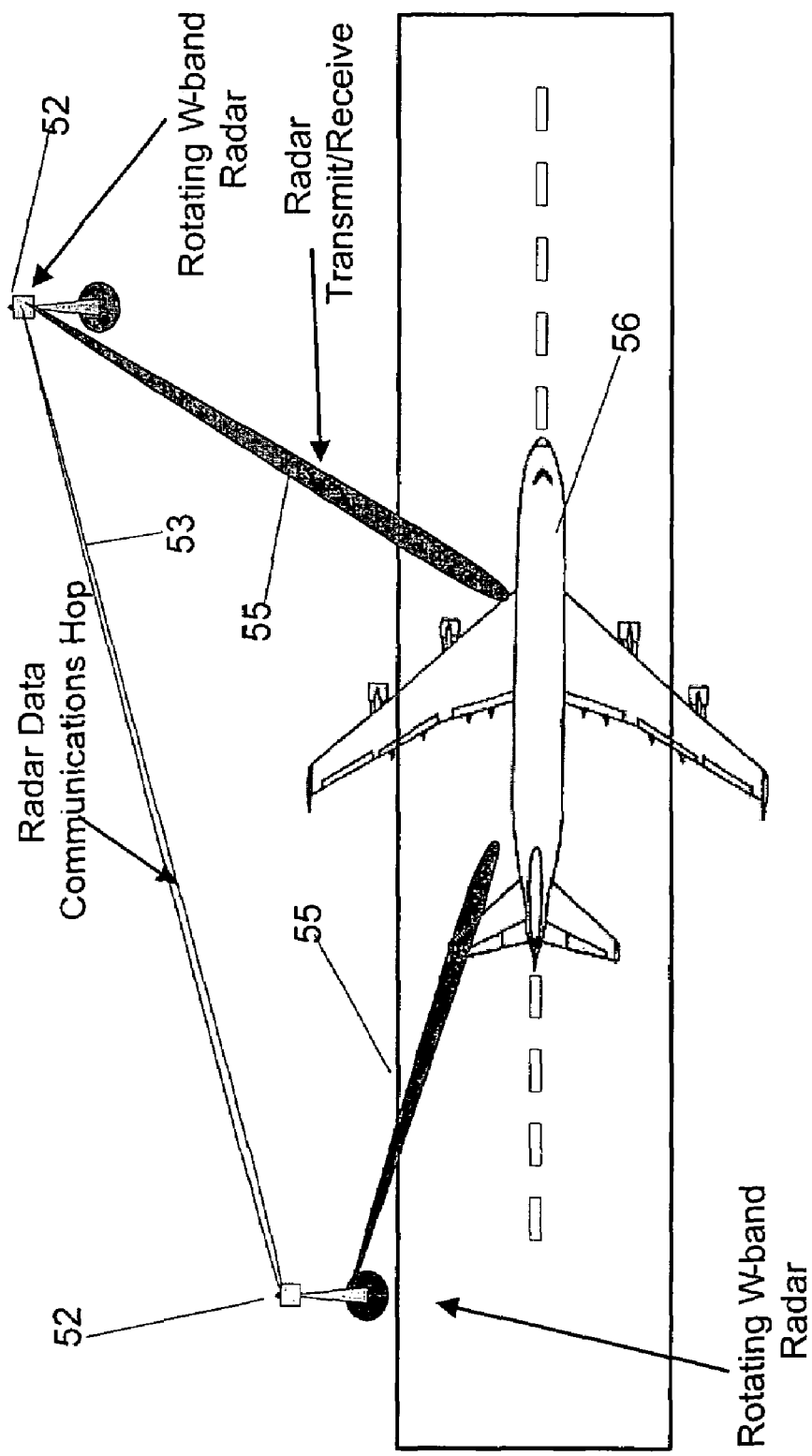
FIG. 5 is an illustration of coordinated communication between W-band radars.

FIG. 5 is an illustration 50 of two W-band radar sensors 52 communicating with each other regarding an aircraft 56. The W-band radar sensors' 52 target beams 55 illuminate the aircraft 56, and the received data from the illumination is forwarded to the neighboring sensor 52 using their own transmit beams when pointed at the neighboring sensor. Each W-band radar sensor 52 has an omni-directional W-band receive antenna through which radar and SSR data is received for use locally or to be passed through the wireless LAN (discussed above) to another user or the CFC using a radar mainlobe transmit sequence.

Since the W-band radar sensors 52 are configured into the LAN, each sensor 52 is assigned an address identifier, for example, an IP address. Data flows between these sensors as needed (and back to the CFC using message protocol or network driven data hops) using scheduled W-band radar transmit beams while sending data to W-band omni-directional receive antennas at each sensor's 52 position. Therefore, each W-band radar sensor 52 can act as a transceiver, forwarding any one of its own data/information to illuminated sensors 52 or suitably configured multilateration sensors (not shown), or forward data/information from the CFC, using its W-band transmit beam.

It should be appreciated that the exemplary multilateration sensors of this invention are capable of a low range capacity, which interrogate and receive replies from nearby surface aircraft. Transmit and receive antennas on the multilateration sensor are capable of omni-directional coverage. The interrogations from each low range multilateration sensor are timed so as not to interfere with any local SSR sensor device. This is done automatically by sampling the 1030 MHz interrogation frequency for any existing SSR equipment and measuring the time between interrogations to obtain interrogation-free time windows. Using the exemplary LAN of this invention, each multilateration sensor is assigned a time slot to interrogate its local area within the time windows. The interrogating sensors allow a much higher data interrogation rate to be used, for example, 1 sec vs. the approximately 5 sec (12 rpm) used by a typical airport SSR. The higher data rate ensures higher positional accuracy. By use of a low power, low range SSR interrogation/receive equipment, the data rate and accuracy of SSR based location services can be increased.

For example, the low range capable multilateration sensors of this invention can have a low emitted power (milliwatt) to activate a transponder in an aircraft that's within range of the co-located W-band radar sensor. The multilateration sensor also has low receive sensitivity to the aircraft's interrogation reply (at 1090 MHz, for example). This avoids polling of and interference from airborne aircraft in the vicinity of the airport.

The interrogation replies from local aircraft contain tail number information that's associated with plots and tracks from the W-band radar sensors. Range information (for example, by using TDOA) can also be received by the low range capable multilateration sensors and used in the fusion process.

If desired, the receiver sensitivity of each low range capable multilateration sensor can be increased so that several of these sensors can receive interrogation replies from a single aircraft. The known geometry of these receivers, along with the aircraft's tail number, can then be used in a multilateration algorithm at the CFC to further aid correlation of SSR replies with W-band radar sensor plots and tracks.

Integration of W-band radar sensor and low range SSR reports, for example, into a CFC where radar plots, radar tracks, SSR reports are combined into a radar and multilateration fusion process to provide the total airport surface situation, and trigger warning alarms to ground controllers of the possibility of dangerous aircraft and vehicle movements (e.g., runway incursion).

Figure 6:
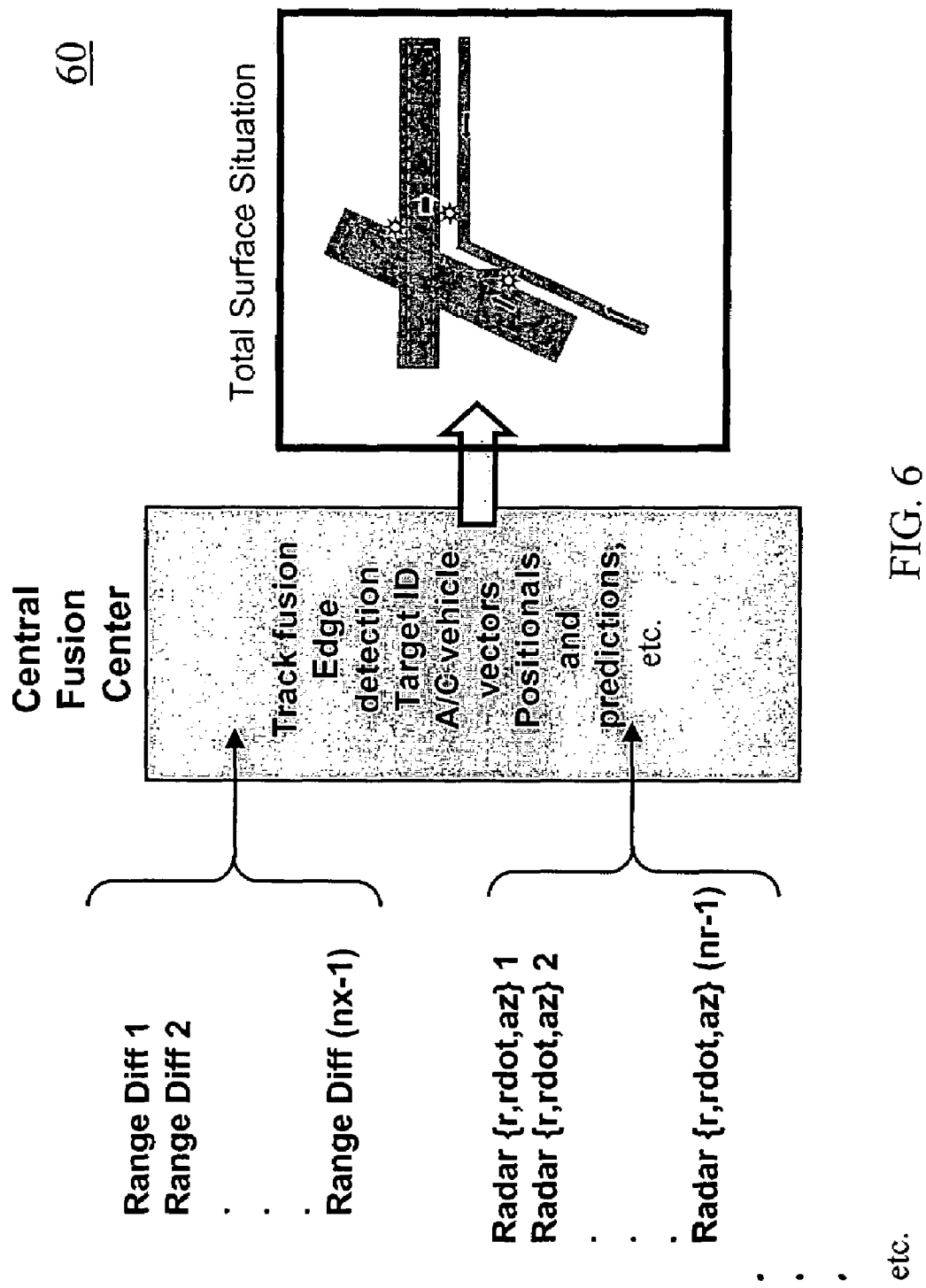
FIG. 6 is an illustration of the central fusion center operation.

FIG. 6 is an illustration 60 of the exemplary Central Fusion Center (CFC) operation. The exemplary CFC is use to collect, process and redistribute data from the distributed multilateration and W-band radar sensor sets described above. Processing may include association between multilateration sensors and their low power SSR data, for example, and plots and reports, track information and fusion and control the W-band radar sensor assets. Data from other airport sensors or even other CFCs could also be incorporated into the CFC. Range information, target ID's, identification, extremity positioning on the tarmac/runway, orientation, and possible incursions can be extracted from the fused sensor data.

Airport situational awareness displays may be generated from these CFC processed data. Complex positional prediction algorithms can be used to determine likely dangerous aircraft movement and set an alarm to operators using visual and audio signals, if desired. Information, as designated, is forwarded to the control tower other relevant crew. Therefore, the fusion of data and extracted information from the various sensors of this invention enable accurate detection of surface targets, identification, geometry determination, orientation, speed, etc., to provide enhanced airport traffic management.

It should be appreciated that while the various exemplary embodiments of this invention are discussed in the context of only W-band radar sensors, replacement of one or more of the W-band radar sensors of the exemplary embodiments may be made using radars of other frequencies that provide similar miniaturized footprints and fidelity capabilities.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An airport surface target surveillance and tracking system, comprising:
   a plurality of distributed, miniaturized W-band radar scanning sensors to detect aircraft targets within an airport;
   at least one low-range multilateration sensor to interrogate aircraft targets and receive respective tail numbers and range data therefrom;
   a data fusion center, connected to the W-band radar scanning sensors and the multilateration sensor via a communication link, to receive W-band and multilateration sensor data, to determine aircraft target model based on W-band sensor data, to determine aircraft identity based on tail number, and to track aircraft targets based on W-band sensor data and, optionally, multilateration sensor data.

2. The surface target surveillance and tracking system according to claim 1, further comprising a communication connection between the plurality of W-band sensors and the multilateration sensor.

3. The surface target surveillance and tracking system according to claim 1, wherein the communication link further comprises, communication between neighboring W-band sensors of the plurality of W-band sensors using a W-band transmission.

4. The surface target surveillance and tracking system according to claim 1, wherein the communication link is an Internet Protocol (IP) network.

5. The surface target surveillance and tracking system according to claim 1, wherein at least one of the plurality of W-band sensors and multilateration sensor is assigned a communication link identifier address.

6. The surface target surveillance and tracking system according to claim 5, wherein the communication link identifier address is an IP address.

7. The surface target surveillance and tracking system according to claim 1, wherein at least one of the plurality of W-band sensors has 2-D Doppler capability.

8. The surface target surveillance and tracking system according to claim 1, wherein at least one of the plurality of W-band sensors has a range of approximately 250 meters.

9. The surface target surveillance and tracking system according to claim 1, wherein at least one of the plurality of W-band sensors has a target resolution of approximately 1 meter.

10. The surface target surveillance and tracking system according to claim 1, wherein at least one of the plurality of W-band sensors uses an edge detection technique to determine an edge of a detected target.

11. The surface target surveillance and tracking system according to claim 1, wherein at least one of the plurality of W-band sensors scan a limited sector.

12. The surface target surveillance and tracking system according to claim 1, wherein at least the scan angle of the W-band sensors is controllable by the data fusion center.

13. The surface target surveillance and tracking system according to claim 1, wherein there are a plurality of multilateration sensors distributed within the airport.

14. The surface target surveillance and tracking system according to claim 1, wherein the multilateration sensor utilizes a Secondary Surveillance Radar (SSR) protocol.

15. The surface target surveillance and tracking system according to claim 1, wherein the multilateration sensor utilizes L-band energy.

16. The surface target surveillance and tracking system according to claim 1, wherein the multilateration sensor operates in a low range mode.

17. The surface target surveillance and tracking system according to claim 1, wherein the multilateration sensor utilizes time-difference-of-arrival measurements to determine a range of the responding tail number aircraft.

18. The surface target surveillance and tracking system according to claim 1, wherein the multilateration sensors operate within Secondary Surveillance Radar (SSR) idle windows of other SSR equipment on the airport.

19. The surface target surveillance and tracking system according to claim 1, wherein the data fusion center further determines a geometry of the target and respective orientation on the airport.

20. The airport surface target surveillance and tracking system according to claim 1, wherein the data fusion center further determines an imminent incursion.

21. The airport surface target surveillance and tracking system according to claim 20, wherein the data fusion center signals a control tower crew as to the imminent incursion.

22. The airport surface target surveillance and tracking system according to claim 20, wherein the data fusion center signals a crew of the target as to the imminent incursion.

23. The airport surface target surveillance and tracking system according to claim 22, wherein the data fusion center activates airport indicators to signal the crew of the target as to the imminent incursion.

24. The airport surface target surveillance and tracking system according to claim 1, wherein the data fusion center is a distributed system of networked computers.

25. The airport surface target surveillance and tracking system according to claim 1, wherein the data fusion center determines positions of structures of the target on the airport.

26. The surface target surveillance and tracking system according to claim 1, wherein the low-range multilateration sensor is configured to determine an interrogation-free time window and synchronize an interrogation within the window.

27. The surface target surveillance and tracking system according to claim 1, wherein the low-range multilateration sensor is configured to transmit an interrogation to the aircraft target at a rate substantially greater than once every five seconds.

28. The surface target surveillance and tracking system according to claim 1, wherein the low-range multilateration sensor is colocated with one of the W-band radar scanning sensors.

29. The surface target surveillance and tracking system according to claim 1, wherein the determining a type of the aircraft target comprises performing an azimuthal scan.

30. The surface target surveillance and tracking system according to claim 29, wherein the determining a type of the aircraft target comprises performing a vertical scan.

31. The surface target surveillance and tracking system according to claim 30, wherein the determining a type of the surface target comprises cross-referencing dimensions and aspects of known surface targets.

32. An airport surface target surveillance and tracking system, comprising:
   a plurality of distributed, miniaturized W-band energy emitting means to detect aircraft targets within an airport;
   at least one multilateration sensing means to interrogate aircraft targets and receive respective tail numbers and range data therefrom;
   a data fusion means, connected to the W-band energy emitting means and the multilateration sensing means via a communications networking means, to determine aircraft target model based on W-band energy emitting means data, and to determine aircraft target location, speed and orientation based on W-band sensor data and, optionally, multilateration sensing means data.

33. The surface target surveillance and tracking system according to claim 32, further comprising a data exchange means for exchanging data between neighboring W-band energy emitting means of the plurality of W-band energy emitting means, the exchanging means using a W-band transmission.

34. The surface target surveillance and tracking system according to claim 32, wherein at least one of the plurality of W-band energy emitting means has 2-D Doppler capability.

35. The surface target surveillance and tracking system according to claim 32, wherein at least one of the plurality of W-band energy emitting means has a range of approximately 250 meters.

36. The surface target surveillance and tracking system according to claim 32, wherein at least one of the plurality of W-band energy emitting means has a target resolution of approximately 1 meter.

37. The surface target surveillance and tracking system according to claim 32, wherein at least one of the plurality of W-band energy emitting means uses an edge detection technique to determine an edge of a detected target.

38. The surface target surveillance and tracking system according to claim 32, wherein at least one of the plurality of W-band energy emitting means scan a limited sector.

39. The surface target surveillance and tracking system according to claim 32, wherein at least the scan angle of the W-band energy emitting means is controllable by the data fusion means.

40. The surface target surveillance and tracking system according to claim 32, wherein there are a plurality of multilateration means distributed within the airport.

41. The surface target surveillance and tracking system according to claim 32, wherein the interrogating sensing means utilizes a Secondary Surveillance Radar (SSR) protocol.

42. The surface target surveillance and tracking system according to claim 32, wherein the interrogating sensing means utilizes L-band energy.

43. The surface target surveillance and tracking system according to claim 32, wherein the interrogating sensing means operates in a low range mode.

44. The surface target surveillance and tracking system according to claim 32, wherein the interrogating sensing means utilizes time-difference-of-arrival measurements to determine a range of the responding tail number aircraft.

45. The surface target surveillance and tracking system according to claim 32, wherein the interrogating sensing means operate within Secondary Surveillance Radar (SSR) idle time windows of other SSR equipment on the airport.

46. The airport surface target surveillance and tracking system according to claim 32, wherein the data fusion means further determines a geometry of the target and respective orientation on the airport.

47. The airport surface target surveillance and tracking system according to claim 32, wherein the data fusion means further determines an imminent incursion.

48. The airport surface target surveillance and tracking system according to claim 47, wherein the data fusion means signals a control tower crew as to the imminent incursion.

49. The airport surface target surveillance and tracking system according to claim 47, wherein the data fusion center means signals a crew of the target as to the imminent incursion.

50. The airport surface target surveillance and tracking system according to claim 49, wherein the data fusion means activates airport indicators to signal the crew of the target as to the imminent incursion.

51. The airport surface target surveillance and tracking system according to claim 32, wherein the data fusion means utilizes is a distributed system of networked computers.

52. The airport surface target surveillance and tracking system according to claim 32, wherein the data fusion means determines positions of structures of the target on the airport.

53. The surface target surveillance and tracking system according to claim 32, wherein the determining a type of the aircraft target comprises performing an azimuthal scan.

54. The surface target surveillance and tracking system according to claim 53, wherein the determining a type of the aircraft target comprises performing a vertical scan.

55. The surface target surveillance and tracking system according to claim 54, wherein the determining a type of the surface target comprises cross-referencing dimensions and aspects of known surface targets.

56. A method for airport surface target surveillance and tracking, comprising:
    detecting a surface target utilizing a plurality of distributed, miniaturized W-band radar scanning sensors within an airport;
    determining an interrogation-free time window;
    interrogating the surface target using a multilateration sensor;
    acquiring an ID of, and a range to, the surface target during the interrogation-free time window;
    determining information of the detected surface target from at least one of the W-band radar scanning sensors;
    conveying the information, ID and range to a data processing center;
    evaluating the conveyed information and ID;
    quantifying the target based on the conveyed information and ID, including determining a target model based on the W-band sensor information;
    controlling at least two of the W-band sensors to obtain respective, overlapping scans of the target; and
    tracking the target based on the W-band sensor scans and, optionally, the range.

57. The method for airport surface target surveillance and tracking according to claim 56, wherein the conveying the information is accomplished with a wireless network.

58. The method for airport surface target surveillance and tracking according to claim 57, wherein the wireless network utilizes an Internet Protocol (IP).

59. The method for airport surface target surveillance and tracking according to claim 56, wherein the determining information utilizes 2-D Doppler capabilities.

60. The method for airport surface target surveillance and tracking according to claim 56, wherein the determining information utilizes an edge detection technique.

61. The method for airport surface target surveillance and tracking according to claim 56, wherein the controlling is performed by the data processing center.

62. The method for airport surface target surveillance and tracking according to claim 56, wherein the ID is acquired using a low power Secondary Surveillance Radar (SSR) protocol signal.

63. The method for airport surface target surveillance and tracking according to claim 56, further comprising determining the range of the target using time-difference-of-arrival techniques.

64. The method for airport surface target surveillance and tracking according to claim 62, wherein the low power SSR signal is operated within idle time windows of other SSR equipment on the airport.

65. The method for airport surface target surveillance and tracking according to claim 56, wherein the quantifying the target involves determining a geometry of the target.

66. The method for airport surface target surveillance and tracking according to claim 56, further comprising determining an imminent incursion.

67. The method for airport surface target surveillance and tracking according to claim 66, further comprising signaling a control tower as to the imminent incursion.

68. The method for airport surface target surveillance and tracking according to claim 66, further comprising signaling a crew of the target as to the imminent incursion.

69. The method for airport surface target surveillance and tracking according to claim 68, further comprising activating airport indicators to signal the crew of the target as to the imminent incursion.

70. The method for airport surface target surveillance and tracking according to claim 65, wherein quantifying the target involves determining positions of structures of the target on the airport.

71. The method for airport surface target surveillance and tracking according to claim 56, wherein the determining a type of the surface target comprises performing an azimuthal scan.

72. The method for airport surface target surveillance and tracking according to claim 71, wherein the determining a type of the surface target comprises performing a vertical scan.

73. The method for airport surface target surveillance and tracking according to claim 72, wherein the determining a type of the surface target comprises cross-referencing dimensions and aspects of known surface targets.

74. The method for airport surface target surveillance and tracking according to claim 73, wherein the surface targets comprise aircrafts, fire trucks, and baggage trucks.

\* \* \* \* \*